(12) United States Patent
Seo et al.

(10) Patent No.: US 12,524,045 B2
(45) Date of Patent: Jan. 13, 2026

(54) METHOD OF MANUFACTURING A DISPLAY DEVICE

(71) Applicant: Samsung Display Co., Ltd., Yongin-si (KR)

(72) Inventors: Eunwon Seo, Yongin-si (KR); Joon-Ik Lee, Yongin-si (KR)

(73) Assignee: Samsung Display Co., LTD, Gyeonggi-do (KR)

( * ) Notice: Subject to any disclaimer, the term of this patent is extended or adjusted under 35 U.S.C. 154(b) by 186 days.

(21) Appl. No.: 18/331,413

(22) Filed: Jun. 8, 2023

(65) Prior Publication Data

US 2024/0103582 A1   Mar. 28, 2024

(30) Foreign Application Priority Data

Sep. 23, 2022   (KR) .......................... 10-2022-0120589

(51) Int. Cl.
*H01S 4/00* (2006.01)
*G06F 1/16* (2006.01)
*H04M 1/02* (2006.01)

(52) U.S. Cl.
CPC .......... *G06F 1/1656* (2013.01); *G06F 1/1616* (2013.01); *G06F 1/1652* (2013.01); *H04M 1/0216* (2013.01); *H04M 1/0268* (2013.01)

(58) Field of Classification Search
CPC .... G06F 1/1616; G06F 1/1652; G06F 1/1656; H04M 1/0216; H04M 1/0268
See application file for complete search history.

(56) References Cited

U.S. PATENT DOCUMENTS

| | | | |
|---|---|---|---|
| 5,528,078 A | 6/1996 | Shin | |
| 10,198,038 B2 | 2/2019 | Jang et al. | |
| 10,854,828 B2 | 12/2020 | Furuie | |
| 11,163,334 B2 * | 11/2021 | Kang | ..... G06F 1/1601 |
| 11,450,824 B2 * | 9/2022 | Kim | ..... H10K 71/00 |
| 11,579,738 B2 * | 2/2023 | Cho | ..... G06F 3/0446 |
| 2019/0357366 A1 * | 11/2019 | Choi | ..... G09F 9/301 |
| 2020/0381661 A1 | 12/2020 | Lee et al. | |

FOREIGN PATENT DOCUMENTS

| | | |
|---|---|---|
| JP | 2019-003099 | 1/2019 |
| KR | 10-0103902 | 5/1996 |
| KR | 10-2017-0063344 | 6/2017 |
| KR | 10-2020-0138583 | 12/2020 |
| KR | 10-2021-0026578 | 3/2021 |

* cited by examiner

*Primary Examiner* — Paul D Kim
(74) *Attorney, Agent, or Firm* — Harness, Dickey & Pierce, P.L.C.

(57) ABSTRACT

A manufacturing method of a display device includes preparing a display module including a display part, a bending part adjacent to the display part, and a pad part adjacent to the bending part, coupling a lower protective film including a polyimide film to a lower portion of the display module, coupling a window to an upper portion of the display module, removing a portion of the lower protective film corresponding to the display part and the bending part after the coupling of the window to the upper portion of the display module, and coupling a lower protective member corresponding to the display part and including a material different from a material of the lower protective film to the lower portion of the display module.

11 Claims, 14 Drawing Sheets

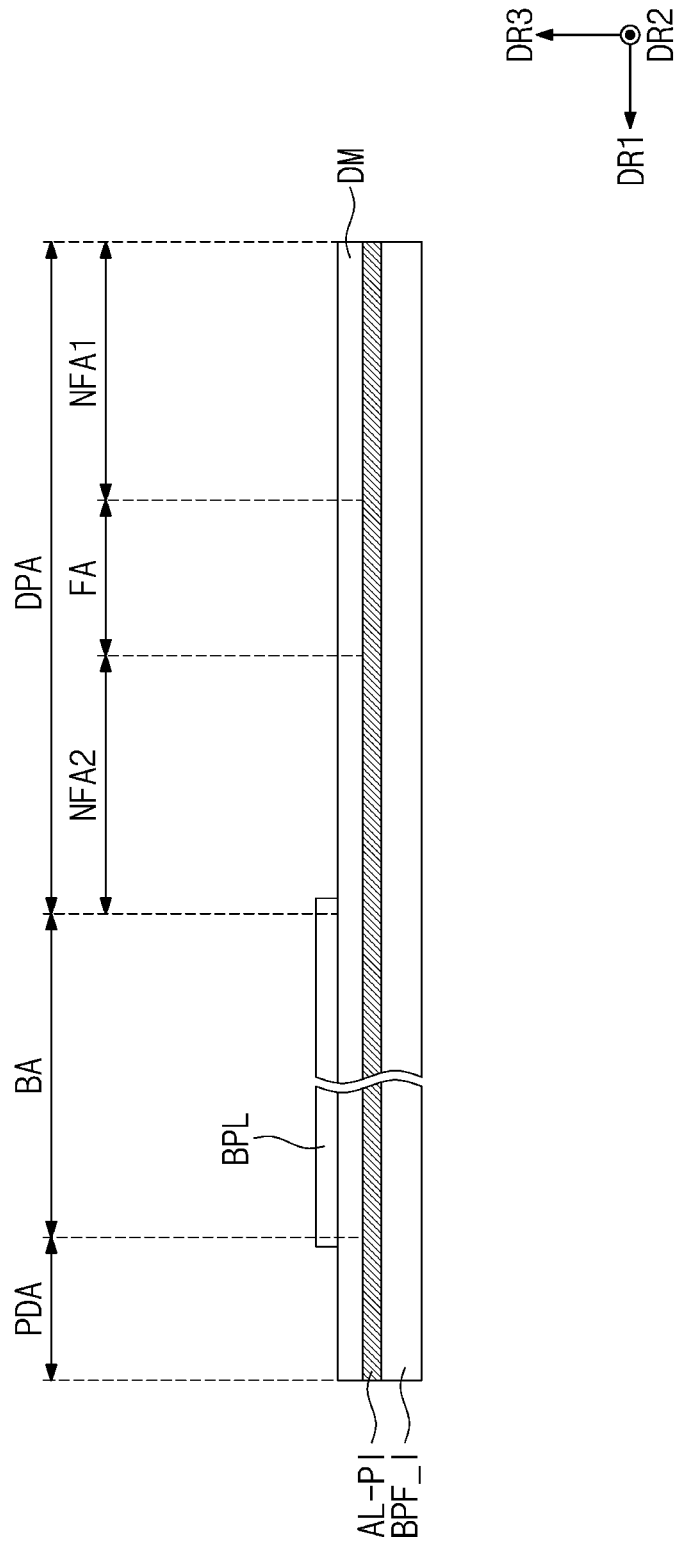

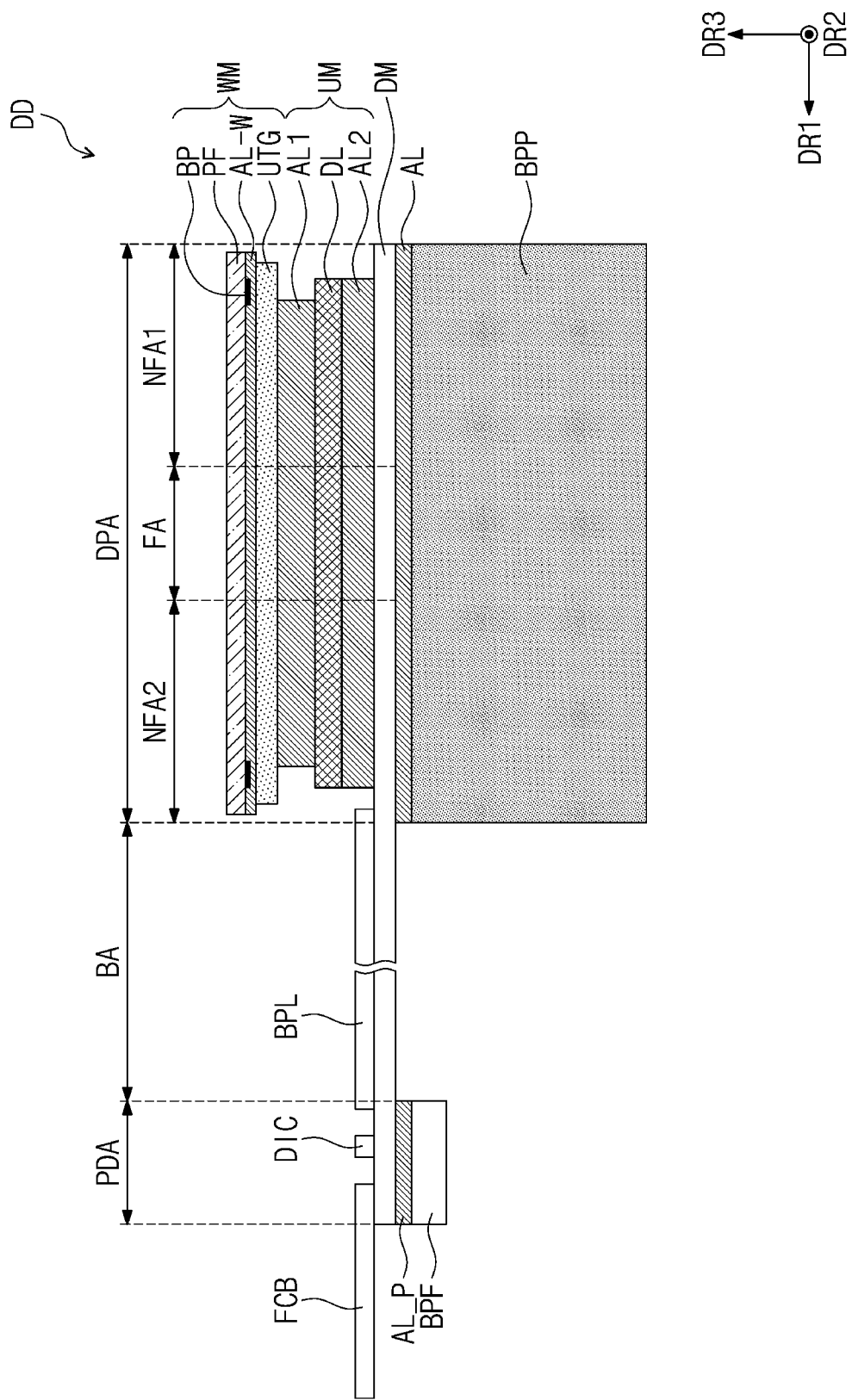

METHOD OF MANUFACTURING A DISPLAY DEVICE

CROSS-REFERENCE TO RELATED APPLICATIONS

This application claims priority under 35 U.S.C. § 119 from Korean Patent Application No. 10-2022-0120589 filed on Sep. 23, 2022 in the Korean Intellectual Property Office, the entire contents of which are incorporated herein by reference.

BACKGROUND

1. Technical Field

The disclosure relates to a display device having reduced thickness and a method of manufacturing the display device with improved process efficiency.

2. Description of the Related Art

A display device includes a display area activated in response to electrical signals. The display device senses inputs applied thereto from the outside and displays images to provide a user with information through the display area. In recent years, as display devices of various shapes are being developed, the shape of the display area may vary.

SUMMARY

The disclosure provides a display device with reduced thickness.

The disclosure provides a method of manufacturing the display device having improved process efficiency.

Embodiments of the inventive concept provide a method of manufacturing a display device, the method may include preparing a display module having a display part, a bending part adjacent to the display part, and a pad part adjacent to the bending part, coupling a lower protective film including a polyimide film to a lower portion of the display module, coupling a window to an upper portion of the display module, removing a portion of the lower protective film corresponding to each of the display part and the bending part after the coupling of the window to the upper portion of the display module, and coupling a lower protective member to a lower portion of the display module to correspond to the display part and may include a material different from a material of the lower protective film.

The removing of the portion of the lower protective film may include irradiating a $CO_2$ laser beam onto a lower surface of the lower protective film.

The lower protective member may have a non-lattice structure.

The lower protective member may include a ceramic-based material.

The lower protective member may have a first non-folding area, a folding area, and a second non-folding area sequentially disposed in a first direction, the lower protective member may include a folding plate having at least a portion that may correspond to the folding area, the folding plate may include a first material, a first plate may correspond to the first non-folding area and may include a second material different from the first material, and a second plate may correspond to the second non-folding area and may include the second material.

The first material may have a Young's modulus smaller than a Young's modulus of the second material.

The folding plate may be disposed between the first plate and the second plate and does not correspond to each of the first non-folding area and the second non-folding area.

The folding plate may include a first portion disposed between the first plate and the second plate and a second portion disposed between the display module and each of the first plate, the second plate, and the first portion.

The folding plate may include a first portion disposed between the first plate and the second plate and a second portion disposed on a lower surface of the first plate, a lower surface of the second plate, and a lower surface of the first portion.

The first material may be selected from resin material, a flexible polymer foam, or a combination thereof, and the second material may include a ceramic-based material.

The lower protective member may be spaced apart from the lower protective film in a first direction while being coupled to the lower portion of the display module.

Embodiments of the inventive concept provide a display device that may include a display module that may include a display part, a bending part adjacent to the display part, and a pad part adjacent to the bending part, a window disposed on the display module to correspond to the display part, a lower protective film may have a polyimide film and disposed under the display module to correspond to the pad part, and a lower protective member disposed under the display module to correspond to the display part. The lower protective member may include a material different from a material of the lower protective film.

The lower protective member may have a non-lattice structure and may include a ceramic-based material.

The lower protective member may have a first non-folding area, a folding area, and a second non-folding area sequentially disposed in a first direction, the lower protective member may include a folding plate having at least a portion that may correspond to the folding area, the folding plate may include a first material, a first plate that may correspond to the first non-folding area and may include a second material different from the first material, and a second plate that may correspond to the second non-folding area and may include the second material.

The first material may have a Young's modulus smaller than a Young's modulus of the second material.

The folding plate may be disposed between the first plate and the second plate and may not correspond to the first non-folding area and the second non-folding area.

The folding plate may include a first portion disposed between the first plate and the second plate and a second portion disposed between the display module and each of the first plate, the second plate, and the first portion.

The folding plate may include a first portion disposed between the first plate and the second plate and a second portion disposed on a lower surface of the first plate, a lower surface of the second plate, and a lower surface of the first portion.

The first material may be selected from a resin material, a flexible polymer foam, or a combination thereof and the second material may include a ceramic-based material.

The lower protective film may be spaced apart from the lower protective member.

According to the above, a release film that protects the display module and a lower structure in the manufacturing process of the display device may be omitted. As the release film is not needed, the manufacturing cost may be reduced by the cost of the release film, and as a process of attaching the release film is not needed, the manufacturing cost and time consumed for the process of attaching the release film may be reduced.

According to the above, a portion of a preliminary lower protective film corresponding to the display part and the bending part may be removed by irradiating the $CO_2$ laser beam onto the preliminary lower protective film just one time. As the $CO_2$ laser beam is irradiated just one time, a tact time of the manufacturing process of the display device may be shortened. That is, the time required to product the display device may be shortened.

According to the above, as the lower protective member may be coupled to the lower portion of the display module after the portions of the preliminary lower protective film are removed, so that the thickness of the lower structure of the display module may be reduced. Accordingly, a bending or folding operation of the display device may become easier.

According to the above, the folding plate of the lower protective member may include the first material having low modulus characteristics, and the first plate and the second plate of the lower protective member may include the second material having high modulus characteristics. Thus, the strength of the first plate and the second plate may be improved, and the folding function of the folding plate may be enhanced. As the lower protective member does not have a separate hole, e.g., a lattice structure, creases occurring in the display device may be reduced.

BRIEF DESCRIPTION OF THE DRAWINGS

An additional appreciation according to the embodiments of the disclosure will become more apparent by describing in detail the embodiments thereof with reference to the accompanying drawings, wherein:

FIGS. 7A to 7E are schematic cross-sectional views of a method of manufacturing a display device according to an embodiment of the disclosure.

DETAILED DESCRIPTION OF THE EMBODIMENTS

Figure 1A:
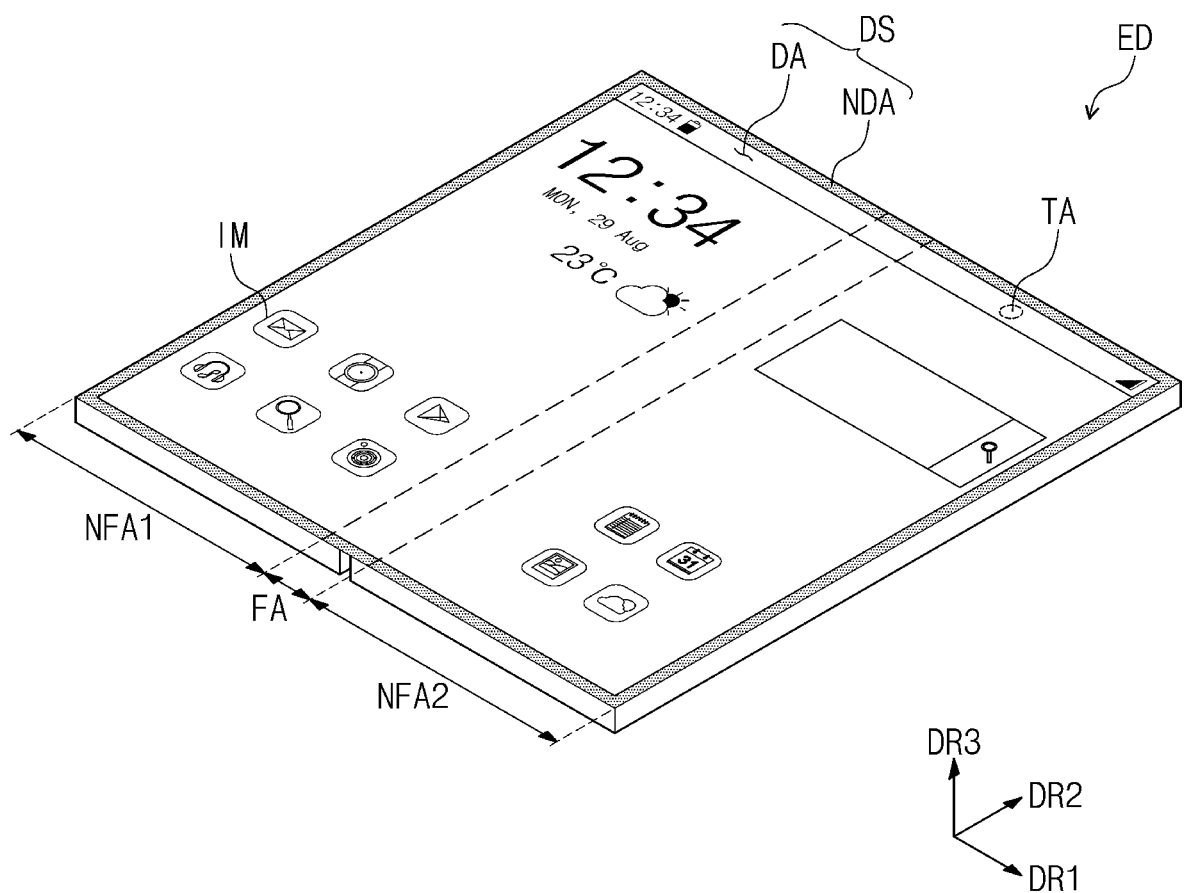
FIG. 1A is a perspective view of an electronic device according to an embodiment of the disclosure.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

Unless otherwise specified, the illustrated embodiments are to be understood as providing features of the invention. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals and/or reference characters denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Also, when an element is referred to as being "in contact" or "contacted" or the like to another element, the element may be in "electrical contact" or in "physical contact" with another element; or in "indirect contact" or in "direct contact" with another element. Further, the X-axis, the Y-axis, and the Z-axis are not limited to three axes of a rectangular coordinate system, such as the x, y, and z axes, and may be interpreted in a broader sense. For example, the X-axis, the Y-axis, and the Z-axis may be perpendicular to one another, or may represent different directions that are not perpendicular to one another. For the purposes of this disclosure, "at least one of A and B" may be construed as A only, B only, or any combination of A and B. Also, "at least one of X, Y, and Z" and "at least one selected from the group consisting of X, Y, and Z" may be construed as X only, Y only, Z only, or any combination of two or more of X, Y, and Z. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

Hereinafter, embodiments of the disclosure will be described with reference to accompanying drawings. FIG. 1A is a perspective view of an electronic device ED according to an embodiment of the disclosure. FIG. 1A shows an unfolded state of the electronic device ED.

Referring to FIG. 1A, the electronic device ED may be activated in response to electrical signals. The electronic device ED may include various embodiments. The electronic device ED may be a tablet computer, a notebook computer, a computer, or a smart television. In the embodiment, a smart phone will be described as a representative example of the electronic device ED.

The electronic device ED may include a display surface DS defined by a first direction DR1 and a second direction DR2 crossing the first direction DR1. The electronic device ED may display an image IM to a user through the display surface DS.

The display surface DS may include a display area DA and a non-display area NDA around the display area DA. The display area DA may display the image IM, and the non-display area NDA may not display the image IM. The non-display area NDA may surround the display area DA, however the disclosure should not be limited thereto or thereby, and the shape of the display area DA and the shape of the non-display area NDA may vary.

The display surface DS may include a sensing area TA. The sensing area TA may be a portion of the display area DA. The sensing area TA may have a transmittance higher than that of other portions of the display area DA. Hereinafter, the portions of the display area DA external to the sensing area TA may be defined as an ordinary display area.

An optical signal, e.g., a visible light or an infrared light, may pass through the sensing area TA. The electronic device ED may take a picture of an external object using the visible light passing through the sensing area TA or may determine whether an external object may be approaching using the infrared light. FIG. 1A shows one sensing area TA as a representative example, however, the number of the sensing areas TA should not be limited thereto or thereby. According to an embodiment, the sensing area TA may be provided in multiple.

Hereinafter, a direction substantially perpendicular to a plane defined by the first direction DR1 and the second direction DR2 may be referred to as a third direction DR3. Front and lower surfaces of each member of the electronic device ED may be distinguished from each other with respect to the third direction DR3. In the disclosure, the expression "when viewed in a plane" may mean a state of being viewed in the third direction DR3 as in a plan view. Hereinafter, directions respectively indicated by first, second, and third directional axes may be defined as the first, second, and third directions DR1, DR2, and DR3 and may be assigned with same reference numerals as those of the first, second, and third directions DR1, DR2, and DR3.

The electronic device ED may include a folding area FA and non-folding areas NFA1 and NFA2. The non-folding areas NFA1 and NFA2 may include a first non-folding area NFA1 and a second non-folding area NFA2. The folding area FA may be disposed between the first non-folding area NFA1 and the second non-folding area NFA2. The first non-folding area NFA1, the folding area FA, and the second non-folding area NFA2 may be sequentially disposed in the electronic device ED in the first direction DR1.

The folding area FA may be referred to as a foldable area, and the first and second non-folding areas NFA1 and NFA2 may be referred to as a non-foldable area. The folding area FA may be defined adjacent to the first non-folding area NFA1 and the second non-folding area NFA2 and may be folded with respect to a folding axis FX (refer to FIG. 1B).

Figure 1B:
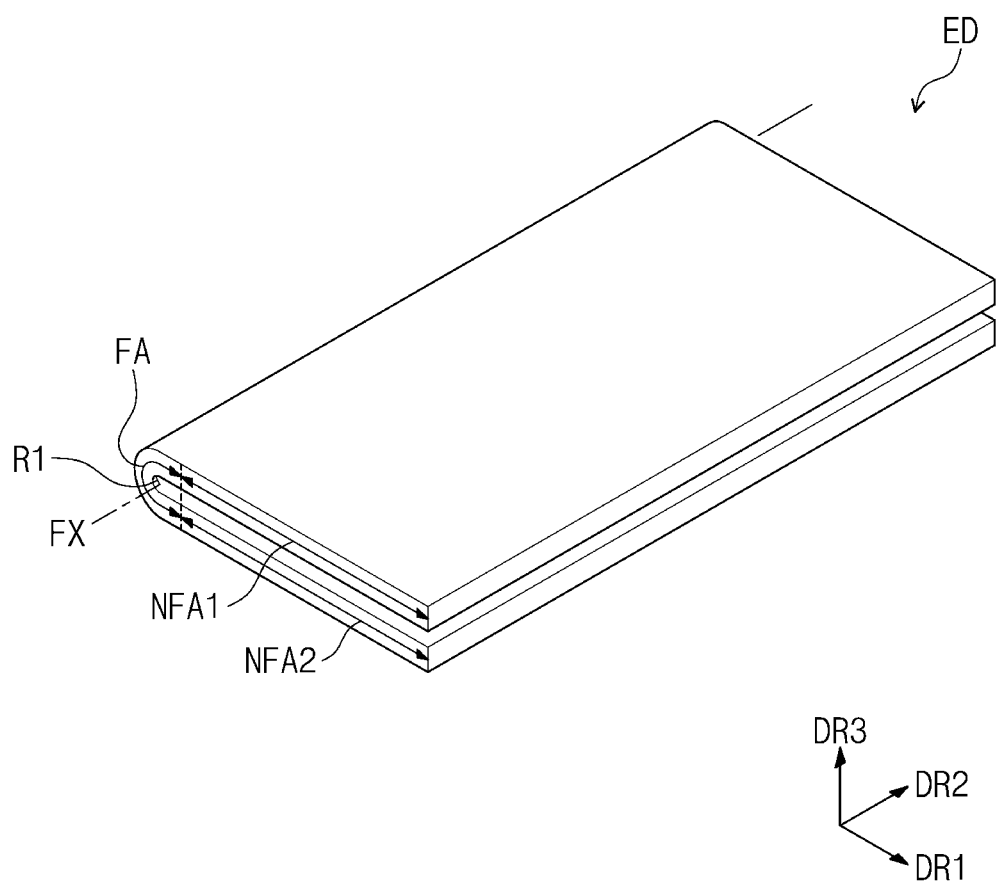
FIG. 1B is a perspective view of an electronic device according to an embodiment of the disclosure.

FIG. 1B is a perspective view of the electronic device ED according to an embodiment of the disclosure. FIG. 1B shows a folded state of the electronic device ED. Referring to FIG. 1B, the folding area FA may be folded with respect to the folding axis FX substantially parallel to the second direction DR2. The folding area FA may have a radius of curvature R1. The electronic device ED may be inwardly folded (inner-folding) with respect to the folding axis FX such that the first non-folding area NFA1 may face the second non-folding area NFA2 and the display surface DS may not be exposed to the outside.

FIG. 1B shows the inner-folding state, however, the disclosure should not be limited thereto or thereby. As an example, the electronic device ED may be outwardly folded (outer-folding) such that the display surface DS may be exposed to the outside. In an embodiment of the inventive concept, the electronic device ED may be configured so that the inner-folding operation and the outer-folding operation may be alternately repeated from an unfolding operation, but the embodiment of the inventive concept may not be limited thereto. In an embodiment of the inventive concept, the electronic device ED may be designed to select any one of the unfolding operation, the inner-folding operation, or the outer-folding operation.

Figure 2A:
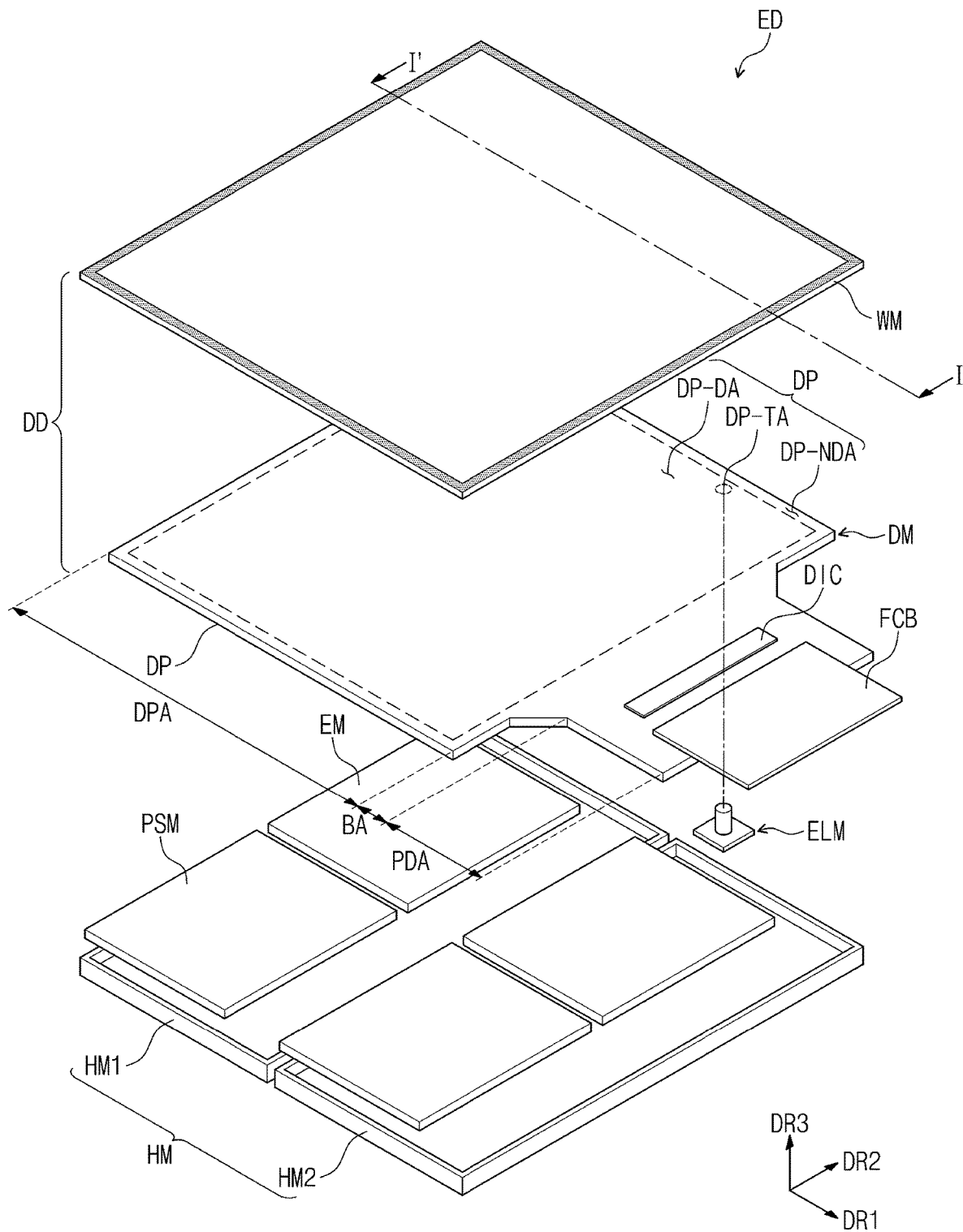
FIG. 2A is an exploded perspective view of an electronic device according to an embodiment of the disclosure.
Figure 2B:
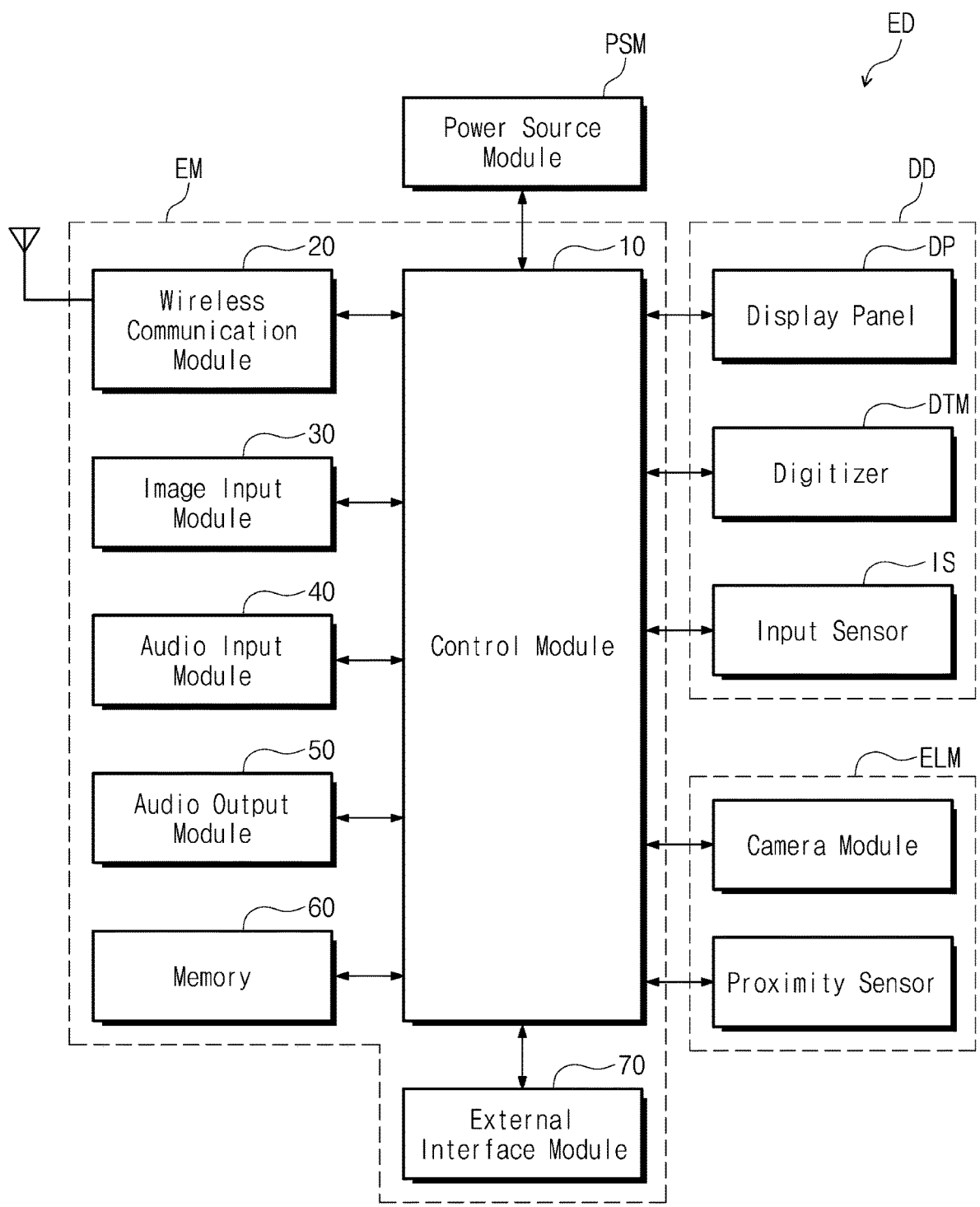
FIG. 2B is a schematic block diagram of an electronic device according to an embodiment of the disclosure.

FIG. 2A is an exploded perspective view of the electronic device ED according to an embodiment of the disclosure. FIG. 2B is a schematic block diagram of the electronic device ED according to an embodiment of the disclosure. Referring to FIGS. 2A and 2B, the electronic device ED may include a display device DD, an electronic module EM, an electro-optical module ELM, a power source module PSM, and a housing HM. Although not shown in figures, the electronic device ED may further include a mechanical structure to control a folding operation of the display device DD.

The display device DD may generate an image and may sense an external input. The display device DD may include a window WM and a display module DM. The window WM may provide a front surface of the electronic device ED. The window WM may be coupled to the housing HM to form an external appearance of the electronic device ED and may protect the display module DM. The window WM may include a material with high light transmittance.

The display module DM may serve as an output device displaying an image and may also serve as an input device sensing an input applied thereto from the outside. The display module DM may include a display panel DP. FIG. 2A shows only the display panel DP among a stack structure of the display module DM, however, the display module DM may further include components disposed at an upper side of the display panel DP.

The display panel DP should not be limited, and for example, the display panel DP may be a light emitting type display panel, such as an organic light emitting display panel, or a quantum dot light emitting display panel. The display panel DP may include a micro light-emitting element such as a micro-LED or a nano-LED. The display panel DP may include a display area DP-DA, a non-display area DP-NDA, and a sensing area DP-TA, which respectively correspond to the display area DA (refer to FIG. 1A), the non-display area NDA (refer to FIG. 1A), and the sensing area TA (refer to FIG. 1A) of the electronic device ED. The sensing area DP-TA may have a resolution lower than that of the display area DP-DA. In the disclosure, the expression "an area/portion corresponds to another area/portion" means that "an area/portion overlaps another area/portion", however, the "areas and portions" should not be limited to having a same size as each other.

The display panel DP may include a display part DPA, a bending part BA adjacent to the display part DPA and a pad part PDA adjacent to the bending part BA. For example, the display part DPA, the bending part BA, and the pad part PDA may be sequentially arranged in the first direction DR1. The bending part BA and the pad part PDA may be portions of the non-display area DP-NDA. The bending part BA may be defined between the display part DPA and the pad part PDA.

The display part DPA may correspond to the display surface DS of FIG. 1A. For example, the display part DPA may be an area through which the image IM (refer to FIG. 1A) may be displayed. The bending part BA may be bent such that a rear surface of the display part DPA and a rear surface of the pad part PDA may face each other. Multiple pads may be arranged in the pad part PDA. A length in the second direction DR2 of each of the bending part BA and the pad part PDA may be smaller than a length in the second direction DR2 of the display part DPA. Since the length in the second direction DR2 of the bending part BA may be relatively small, the bending part BA may be readily bent.

A driving chip DIC may be disposed on the pad part PDA. The driving chip DIC may include driving elements, e.g., a data driving circuit to drive pixels of the display panel DP. FIG. 2A shows a structure in which the driving chip DIC may be mounted on the display panel DP, however the disclosure should not be limited thereto or thereby. As an example, the driving chip DIC may instead be mounted on a flexible circuit board FCB.

The flexible circuit board FCB may be coupled to the pad part PDA. The flexible circuit board FCB may be electrically connected to a main circuit board. The main circuit board may be an electronic component constituting the electronic module EM.

The electronic module EM may be disposed on the housing HM. The electronic module EM may be disposed in each of a first housing HM1 and a second housing HM2. The electronic module EM disposed in the first housing HM1 and the electronic module EM disposed in the second housing HM2 may be electrically connected to each other via a flexible circuit board (not shown). The electronic module EM will be described in detail with reference to FIG. 2B.

The electro-optical module ELM may be an electronic component that outputs or receives an optical signal. The electro-optical module ELM may include a camera module and/or a proximity sensor. The camera module may take a picture of an external object via the sensing area DP-TA.

The power source module PSM may be disposed on the housing HM. The power source module PSM may be disposed in each of the first housing HM1 and the second housing HM2. The power source module PSM may supply a power source necessary for the overall operation of the electronic device ED. The power source module PSM may include a normal battery device.

The housing HM may be coupled to the window WM to accommodate other modules. The housing HM may include the first and second housings HM1 and HM2. FIG. 2A shows a structure in which the first and second housings HM1 and HM2 may be separated from each other as a representative example, however it should not be limited thereto or thereby.

Referring to FIG. 2B, the display device DD may further include an input sensor IS and a digitizer DTM. The input sensor IS may sense a user input. For example, the user input may include a proximity input (e.g., a hovering input) applied in case that approaching close to or adjacent to the display device DD at a distance as well as a touch input by a user's body part (e.g., a user's hand). A capacitive type input sensor IS may be disposed on the display panel DP.

The digitizer DTM may sense the external input by an electromagnetic resonance (EMR) method. According to the EMR method, a resonant circuit provided in a stylus pen generates a magnetic field, the vibrating magnetic field induces signals to coils included in the digitizer DTM, and a position of the stylus pen may be detected based on the signals induced to the coils. The digitizer DTM may be disposed under the display panel DP.

The electronic module EM may include a control module 10, a wireless communication module 20, an image input module 30, an audio input module 40, an audio output module 50, a memory 60, and an external interface module 70. The electronic module EM may include a main circuit board, and the modules may be mounted on the main circuit board or may be electrically connected to the main circuit board via the flexible circuit board. The electronic module EM may be electrically connected to the power source module PSM.

The control module 10 may control an overall operation of the electronic device ED. For example, the control module 10 may activate or deactivate the display device DD in response to the user input. The control module 10 may control the image input module 30, the audio input module 40, and the audio output module 50 to meet the user input. The control module 10 may include at least one microprocessor.

The wireless communication module 20 may transmit/receive a wireless signal to/from other terminals using Bluetooth or a WiFi link. The wireless communication module 20 may transmit/receive a voice signal using a general communication line. The wireless communication module 20 may include antenna modules.

The image input module 30 may process an image signal and may convert the image signal into image data that may be displayed through the display device DD. The audio input module 40 may receive an external audio signal through a microphone in a record mode or a voice recognition mode and may convert the external audio signal to electronic voice data. The audio output module 50 may convert the audio data provided from the wireless communication module 20 or the audio data stored in the memory 60 and may output the converted audio data to the outside by way of speakers.

The external interface module 70 may serve as an interface between the control module 10 and external devices, such as an external charger, a wired/wireless data port, a card socket (e.g., a memory card and a SIM/UIM card), etc.

Figure 3:
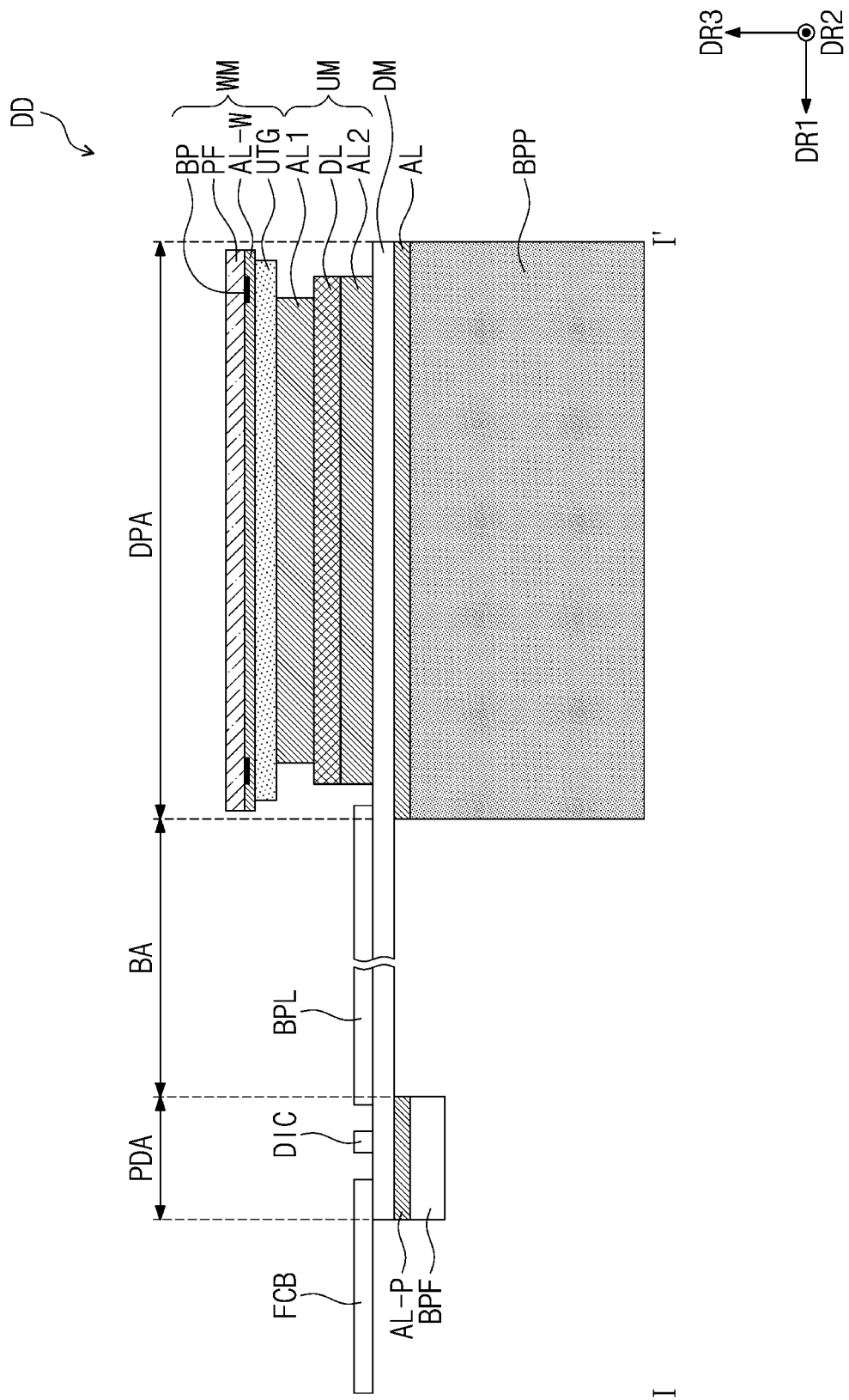
FIG. 3 is a schematic cross-sectional view of a display device according to an embodiment of the disclosure.

FIG. 3 is a schematic cross-sectional view of the display device DD according to an embodiment of the disclosure taken in line I-I' of FIG. 2A. FIG. 3 shows the unfolded state of the display module DM.

Referring to FIG. 3, the display device DD may include the window WM, an upper member UM, the display module DM, a lower protective film BPF, and a lower protective member BPP. The upper module UM may collectively refer to components disposed between the window WM and the display module DM. The window WM may include a glass substrate UTG, a window protective layer PF, a window adhesive layer AL-W, and a bezel pattern BP. The window WM may be disposed to correspond to the display part DPA. The glass substrate UTG may be a chemically strengthened glass. The occurrence of crease in the glass substrate UTG may be minimized even though the folding and unfolding operations may be repeatedly performed.

The window protective layer PF may be disposed on the glass substrate UTG. The window protective layer PF may include a synthetic resin film. As an example, the window protective layer PF may include at least one of polyimide, polycarbonate, polyamide, triacetylcellulose, polymethylmethacrylate, or polyethylene terephthalate. Although not shown in figures, at least one of a hard coating layer, an anti-fingerprint layer, and an anti-reflective layer may be disposed on an upper surface of the window protective layer PF. The window protective layer PF may be coupled with the glass substrate UTG by the window adhesive layer AL-W. The window adhesive layer AL-W may be a pressure sensitive adhesive (PSA) film or an optically clear adhesive (OCA). Adhesive layers described hereinafter may include a same adhesive as the window adhesive layer AL-W.

The bezel pattern BP may be disposed under the window protective layer PF. The bezel pattern BP may correspond to the non-display area NDA shown in FIG. 1A. The bezel pattern BP may be a colored light blocking layer and may be formed by a coating process. The bezel pattern BP may include a base material and a pigment or a dye mixed with the base material. FIG. 3 shows a structure in which the bezel pattern BP may be disposed on a lower surface of the window protective layer PF, however it should not be limited thereto or thereby. According to an embodiment, the bezel pattern BP may instead be disposed on the upper surface of the window protective layer PF.

The upper member UM may include an upper film DL. The upper film DL may absorb external impact applied to the front surface of the display device DD. The upper film DL may include a synthetic resin film. The synthetic resin film may include polyimide, polycarbonate, polyamide, triacetylcellulose, polymethylmethacrylate, or polyethylene terephthalate, or a combination thereof.

The display module DM may have an anti-reflective layer structure including a polarizing film or multiple color filters. In the case where the display module DM has the anti-reflective layer structure, a strength of the front surface of the display device DD against the external impact may be reduced. The upper film DL may compensate for the strength reduction due to the anti-reflective layer structure included in the display module DM. According to an embodiment, the upper film DL may be omitted.

The upper member UM may include a first adhesive layer AL1 that attaches the upper film DL to the window WM and a second adhesive layer AL2 that attaches the upper film DL to the display module DM. Each of the first adhesive layer AL1 and the second adhesive layer AL2 may be a pressure sensitive adhesive (PSA) film, an optically clear adhesive (OCA), or a combination thereof.

The lower protective film BPF may be disposed under the display module DM. The lower protective film BPF may protect a portion of a lower portion of the display module DM and may prevent static electricity from being generated in the display panel DP (refer to FIG. 2A). The lower protective film BPF may improve a compression uniformity in a compression process of manufacturing the display device DD and may prevent external foreign substances from being introduced throughout the manufacturing process of the display device DD. The lower protective film BPF may be disposed to correspond to the pad part PDA. The lower protective film BPF may include a flexible synthetic resin film. As an example, the lower protective film BPF may include a polyimide film.

A protective film adhesive layer AL-P may attach the lower protective film BPF to the display module DM. The display module DM may be disposed on (e.g., directly on) the protective film adhesive layer AL-P, and the lower protective film BPF may be disposed under (e.g., directly under) the protective film adhesive layer AL-P.

The lower protective member BPP may be disposed under the display module DM. The lower protective member BPP may protect a portion of the lower portion of the display module DM. The lower protective member BPP may be disposed to correspond to the display part DPA. The lower protective film BPF may include a material different from a material of the lower protective member BPP. As an example, the lower protective member BPP may include a ceramic-based material, a resin material, a flexible polymer foam, or a combination thereof.

An adhesive layer AL may attach the lower protective member BPP to the display module DM. The adhesive layer AL may be disposed on (e.g., directly on) a lower surface of the display module DM, and the lower protective member BPP may be disposed on (e.g., directly on) a lower surface of the adhesive layer AL.

The lower protective film BPF may not be disposed in any of the bending part BA and the display part DPA. The lower protective member BPP may not be disposed in any of the bending part BA and the pad part PDA. Therefore, none of the lower protective member BPP and the lower protective film BPF may be disposed in the bending part BA. Consequently, the lower protective film BPF and the lower protective member BPP may be spaced apart from each other in the first direction DR1.

Although not shown in FIG. 3, the display device DD may further include a support member, a cover layer, a digitizer, an electromagnetic shielding layer, and a metal layer under the lower protective member BPP.

Figure 4:
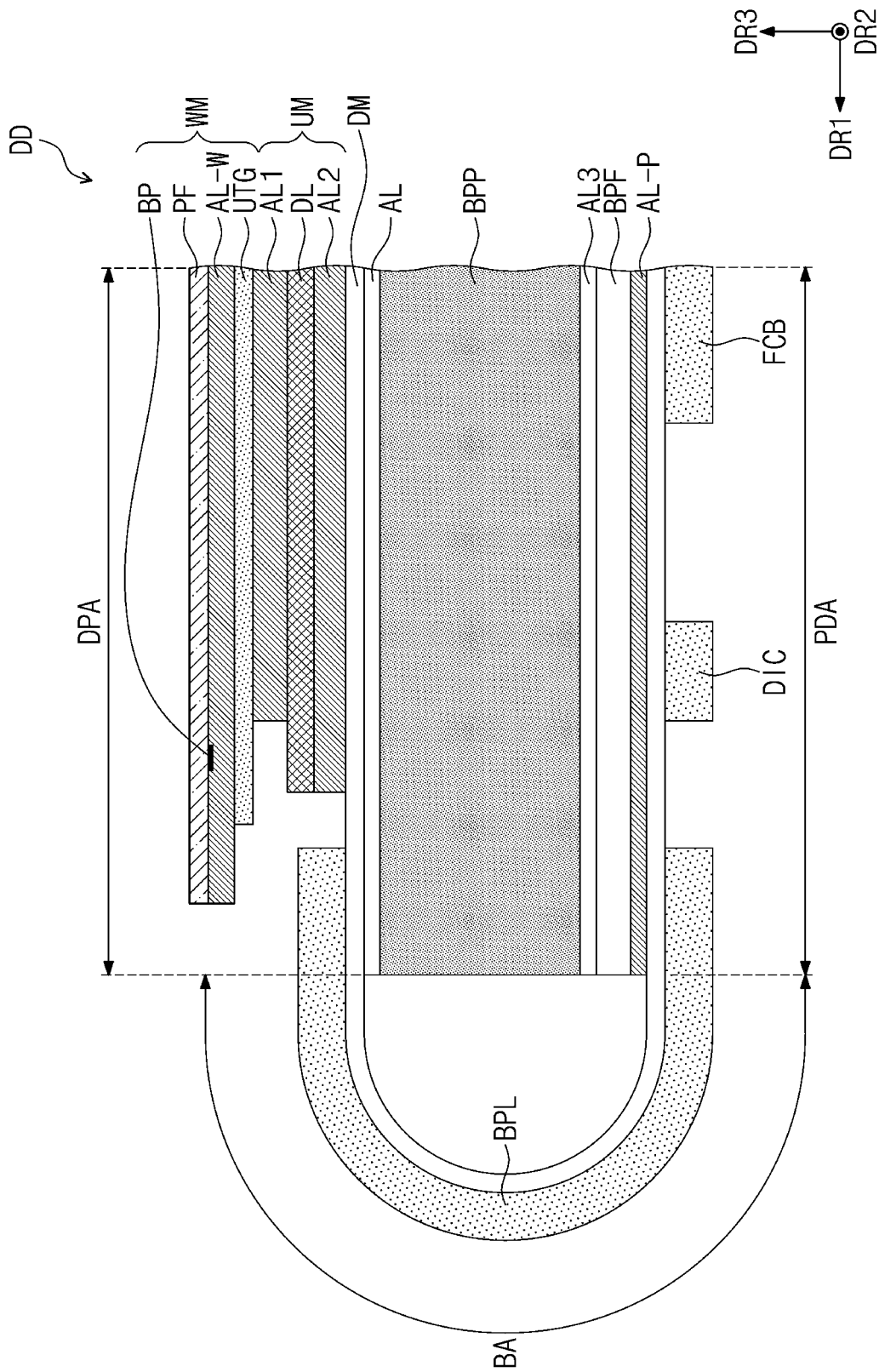
FIG. 4 is a schematic cross-sectional view of a display device according to an embodiment of the disclosure.

FIG. 4 is a schematic cross-sectional view of the display device DD according to an embodiment of the disclosure where the display module DM is in a folded state. Referring to FIGS. 3 and 4, in case that the display module DM may be bent, the bending part BA may have a radius of curvature. In case that the bending part BA may be bent, the lower protective film BPF and the pad part PDA may be disposed under the lower protective member BPP of the display part DPA. Since the lower protective film BPF may not be disposed in the bending part BA, the bending part BA may be readily bent. The lower protective film BPF may be attached to the lower protective member BPP by a third adhesive layer AL3. The third adhesive layer AL3 may instead be omitted.

The display device DD may further include a bending protective layer BPL that protects the bending part BA of the display module DM in case of being bent. The bending protective layer BPL may correspond to the display part DPA, the bending part BA, and the pad part PDA. As an example, the bending protective layer BPL may correspond to the bending part and portions of the display part DPA and the pad part PDA.

The bending protective layer BPL may be bent together with the bending part BA. The bending protective layer BPL may protect the bending part BA from external impact and may control a neutral surface of the bending part BA. The bending protective layer BPL may control the stress of the bending part BA such that the neutral surface may be close to signal lines arranged in the bending part BA.

Figure 5A:
FIG. 5A is a schematic cross-sectional view of a lower protective member according to an embodiment of the disclosure.
Figure 5A:
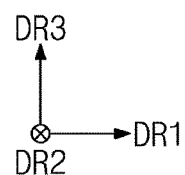

FIG. 5A is a schematic cross-sectional view of the lower protective member BPP according to an embodiment of the disclosure. Referring to FIG. 5A, the lower protective member BPP may include a material with high modulus characteristics. The lower protective member BPP may include a ceramic-based material. As an example, the lower protective member BPP may be attached by sheet coating a material including at least one of SiC and $ZrO_2$.

Figure 5B:
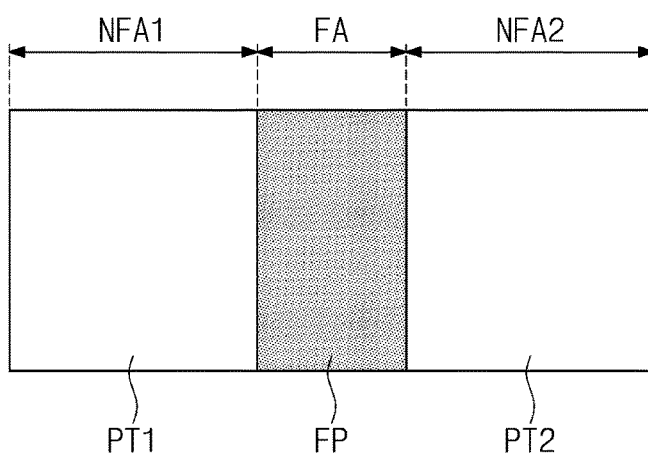
FIG. 5B is a schematic cross-sectional view of a lower protective member according to an embodiment of the disclosure.
Figure 5B:
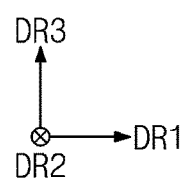

FIG. 5B is a schematic cross-sectional view of a lower protective member BPPa according to an embodiment of the disclosure. Referring to FIG. 5B, a lower protective member BPPa may include a first non-folding area NFA1, a folding area FA, and a second non-folding area NFA2, which may be arranged in the first direction DR1. The first non-folding area NFA1, the folding area FA, and the second non-folding area NFA2 of lower protective member BPPa may correspond to the first non-folding area NFA1, the folding area FA, and the second non-folding area NFA2 of the electronic device ED of FIGS. 1A and 1B upon the lower protective member BPPa being coupled to the display module. The lower protective member BPPa may include a folding plate FP, a first plate PT1, and a second plate PT2.

At least a portion of the folding plate FP may correspond to the folding area FA, and the folding plate FP may include a first material. As an example, the folding plate FP may be disposed between the first plate PT1 and the second plate PT2 and may not correspond to the first non-folding area NFA1 and the second non-folding area NFA2. The first plate PT1 may correspond to the first non-folding area NFA1 and may include a second material different from the first material. The second plate PT2 may correspond to the second non-folding area NFA2 and may include the second material different from the first material.

The first material may have a Young's modulus smaller than a Young's modulus of the second material. The first material may have low modulus characteristics, and the second material may have high modulus characteristics. For example, the first material may have a large strain in case that a force may be applied, and the second material may have a small strain in case that the force may be applied. As an example, the first material may have a yield strength equal to or smaller than about 5 MPa, and the second material may have a yield strength equal to or greater than about 500 MPa. The Young's modulus of the first material may be equal to or smaller than about 1 MPa, and the Young's modulus of the second material may be equal to or greater than about 100 GPa. Accordingly, the strength of the first plate PT1 and the second plate PT2 may increase, and the folding function of the folding plate FP may be improved. Further, since the lower protective member BPPa does not have a separate hole, e.g., a lattice structure, the crease occurring on the display device due to the hole may be reduced.

The first material may include a resin material, a flexible polymer foam, or a combination thereof. As an example, a foam type resin material may be attached to the first plate PT1 and the second plate PT2 of the lower protective member BPPa. The second material may include a ceramic-based material. As an example, the material including at least one of SiC and $ZrO_2$ may be attached to the folding plate FP of the lower protective member BPPa in a sheet coating method.

Figure 5C:
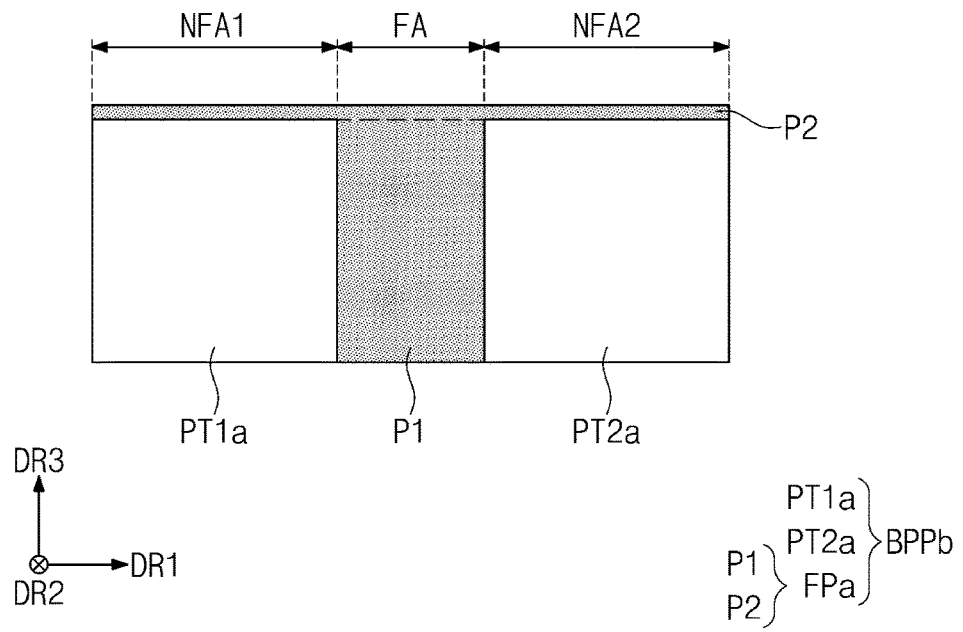
FIG. 5C is a schematic cross-sectional view of a lower protective member according to an embodiment of the disclosure.

FIG. 5C is a schematic cross-sectional view of a lower protective member BPPb according to an embodiment of the disclosure. Referring to FIG. 5C, the lower protective member BPPb may include a first non-folding area NFA1, a folding area FA, and a second non-folding area NFA2, which may be arranged in the first direction DR1. The first non-folding area NFA1, the folding area FA, and the second non-folding area NFA2 of lower protective member BPPb may correspond to the first non-folding area NFA1, the folding area FA, and the second non-folding area NFA2 of the electronic device ED of FIGS. 1A and 1B upon the lower protective member BPPb being coupled to the display module. The lower protective member BPPb may include a folding plate FPa, a first plate PT1a, and a second plate PT2a.

At least a portion of the folding plate FPa may correspond to the folding area FA, and the folding plate FPa may include a first material. As an example, the folding plate FPa may include a first portion P1 and a second portion P2. The first portion P1 may correspond to the folding area FA and may be disposed between the first plate PT1a and the second plate PT2a. The second portion P2 may be disposed between the display module DM (refer to FIG. 3) and each of the first plate PT1a, the second plate PT2a, and the first portion P1 of the folding plate FPa. For example, the second portion P2 may cover an upper surface of each of the first plate PT1a, the second plate PT2a, and the first portion P1.

The first plate PT1a may correspond to the first non-folding area NFA1 and may include a second material different from the first material. The second plate PT2a may correspond to the second non-folding area NFA2 and may include the second material different from the first material.

The first material may have a Young's modulus smaller than a Young's modulus of the second material. The first material may have low modulus characteristics, and the second material may have high modulus characteristics. For example, the first material may have a large strain in case that a force may be applied, and the second material may have a small strain in case that the force may be applied. As an example, the first material may have a yield strength equal to or smaller than about 5 MPa, and the second material may have a yield strength equal to or greater than about 500 MPa. The Young's modulus of the first material may be equal to or smaller than about 1 MPa, and the Young's modulus of the second material may be equal to or greater than about 100 GPa. Accordingly, the strength of the first plate PT1a and the second plate PT2a may increase, and the folding function of the folding plate FPa may be improved. Further, since the lower protective member BPPb does not have a separate hole, e.g., a lattice structure, the crease occurring on the display device due to the hole may be reduced.

The first material may include a resin material, a flexible polymer foam, or a combination thereof. As an example, a foam type resin material may be attached to the first plate PT1a and the second plate PT2a of the lower protective member BPPb. The second material may include a ceramic-based material. As an example, the material including at least one of SiC and $ZrO_2$ may be attached to the folding plate FPa of the lower protective member BPPb in a sheet coating method.

Figure 5D:
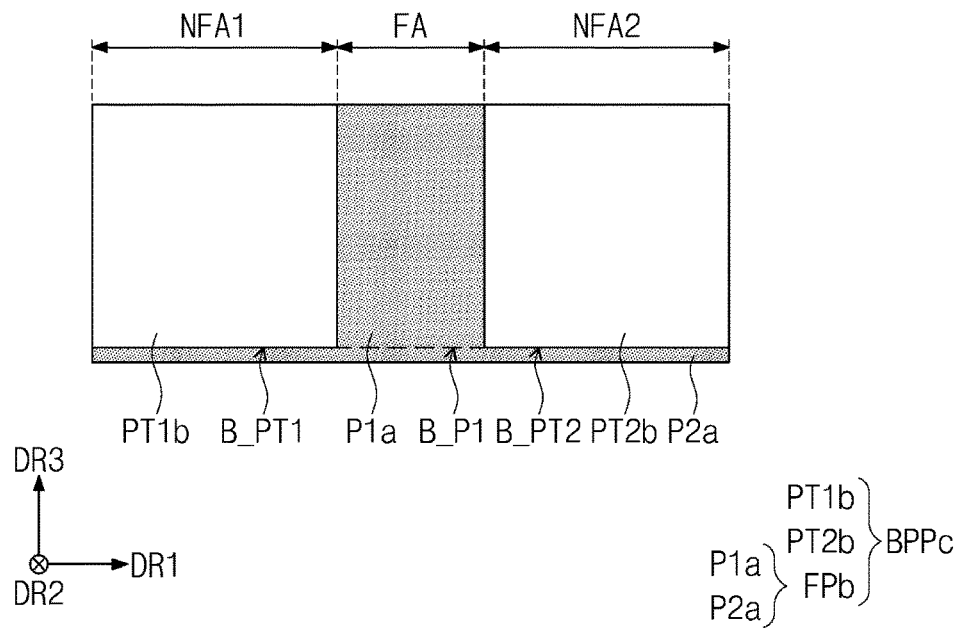
FIG. 5D is a schematic cross-sectional view of a lower protective member according to an embodiment of the disclosure.

FIG. 5D is a schematic cross-sectional view of a lower protective member BPPc according to an embodiment of the disclosure. Referring to FIG. 5D, the lower protective member BPPc may include a first non-folding area NFA1, a folding area FA, and a second non-folding area NFA2, which may be arranged in the first direction DR1. The first non-folding area NFA1, the folding area FA, and the second non-folding area NFA2 of lower protective member BPPc may correspond to the first non-folding area NFA1, the folding area FA, and the second non-folding area NFA2 of the electronic device ED of FIGS. 1A and 1B upon the lower protective member BPPa being coupled to the display module. The lower protective member BPPc may include a folding plate FPb, a first plate PT1b, and a second plate PT2b.

At least a portion of the folding plate FPb may correspond to the folding area FA, and the folding plate FPb may include a first material. As an example, the folding plate FPb may include a first portion P1a and a second portion P2a. The first portion P1a may correspond to the folding area FA and may be disposed between the first plate PT1b and the second plate PT2b. The second portion P2a may be disposed at a lower surface B_PT1 of the first plate PT1b, a lower surface B_PT2 of the second plate PT2b, and a lower surface B_P1 of the first portion P1a. For example, the second portion P2a may cover the lower surface of each of the first plate PT1b, the second plate PT2b, and the first portion P1a.

The first plate PT1b may correspond to the first non-folding area NFA1 and may include a second material different from the first material. The second plate PT2b may correspond to the second non-folding area NFA2 and may include the second material different from the first material.

The first material may have a Young's modulus smaller than a Young's modulus of the second material. The first material may have low modulus characteristics, and the second material may have high modulus characteristics. For example, the first material may have a large strain in case that a force is applied, and the second material may have a small strain in case that the force is applied. As an example, the first material may have a yield strength equal to or smaller than about 5 MPa, and the second material may have a yield strength equal to or greater than about 500 MPa. The Young's modulus of the first material may be equal to or smaller than about 1 MPa, and the Young's modulus of the second material may be equal to or greater than about 100 GPa. Accordingly, the strength of the first plate PT1b and the second plate PT2b may increase, and the folding function of the folding plate FPb may be improved. Further, since the lower protective member BPPc does not have a separate hole, e.g., a lattice structure, the crease occurring on the display device due to the hole may be reduced.

The first material may include a resin material, a flexible polymer foam, or a combination thereof. As an example, a foam type resin material may be attached to the first plate PT1b and the second plate PT2b of the lower protective member BPPc. The second material may include a ceramic-based material. As an example, the material including at least one of SiC and $ZrO_2$ may be attached to the folding plate FPb of the lower protective member BPPc in a sheet coating method.

Figure 6:
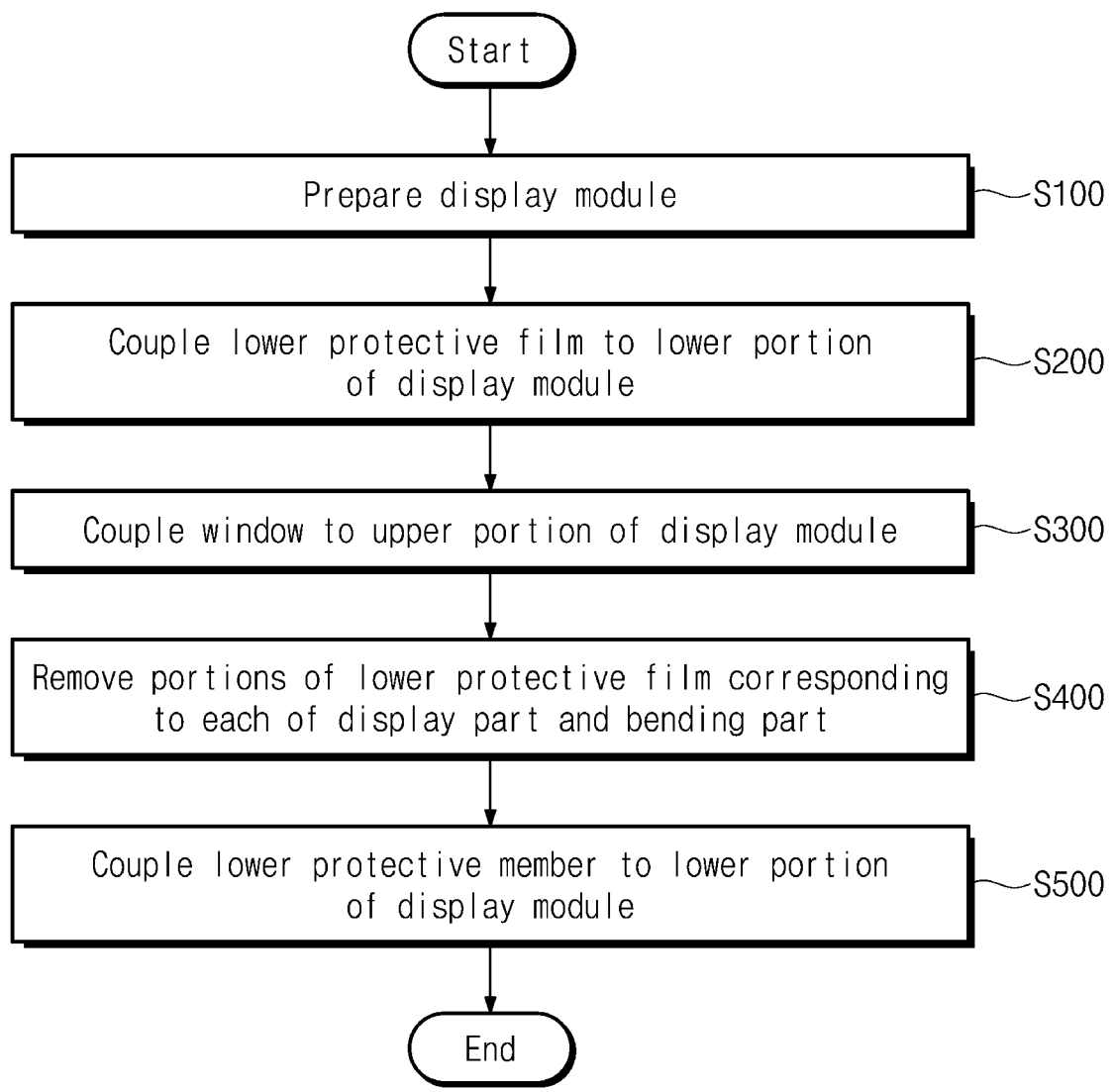
FIG. 6 is a flowchart of a method of manufacturing a display device according to an embodiment of the disclosure.

FIG. 6 is a flowchart of a method of manufacturing the display device according to an embodiment of the disclosure. Referring to FIG. 6, the manufacturing method of the display device may include preparing the display module (S100), coupling the lower protective film to the lower portion of the display module (S200), coupling the window to the upper portion of the display module (S300), removing portions of the lower protective film corresponding to the display part and the bending part (S400), and coupling the lower protective member to the lower portion of the display module (S500).

Figure 7A:
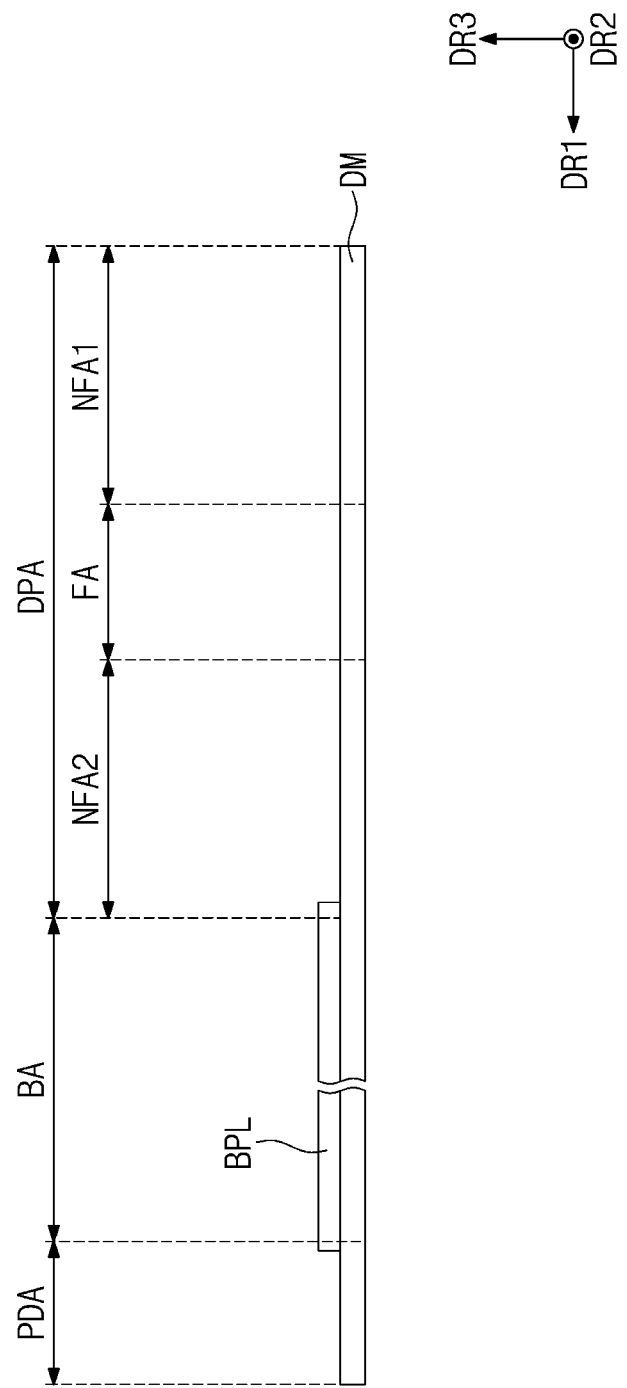
Figure 7C:
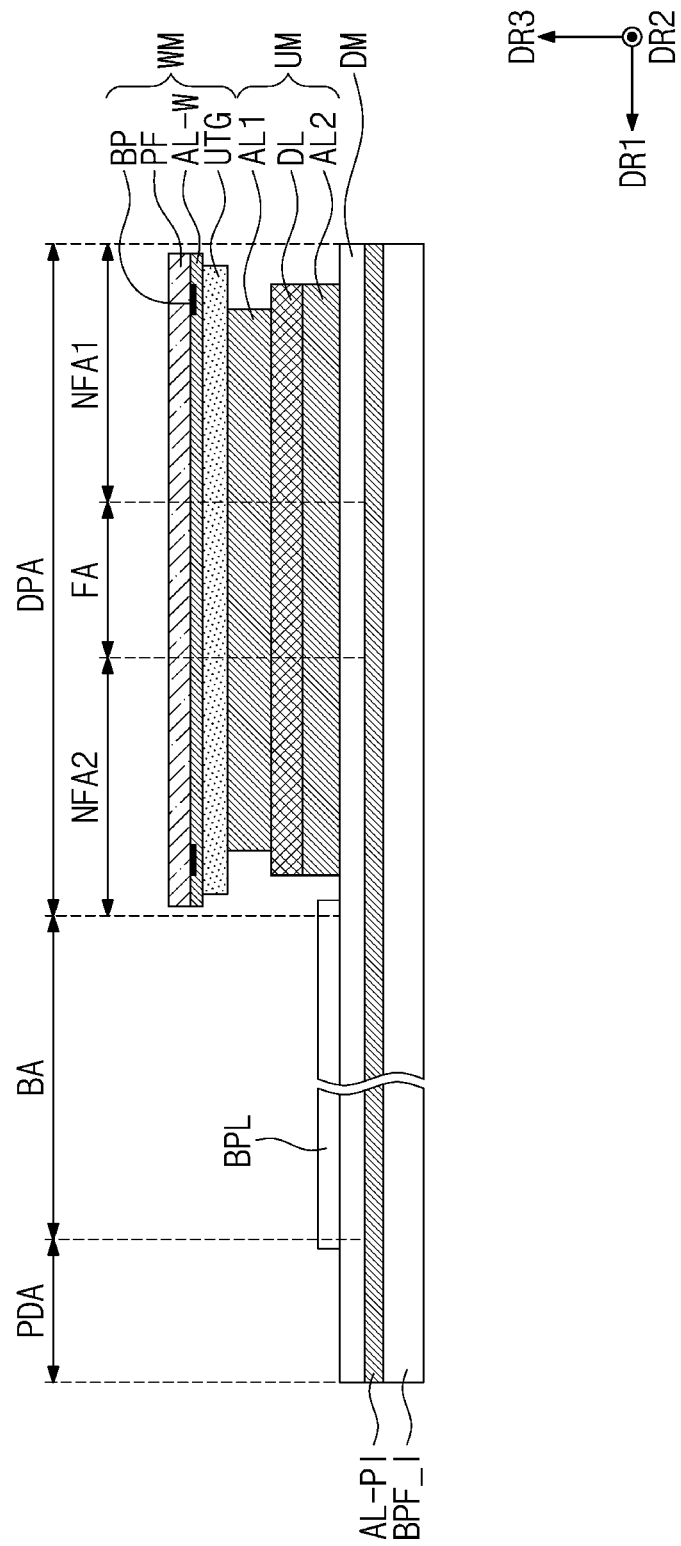
Figure 7D:
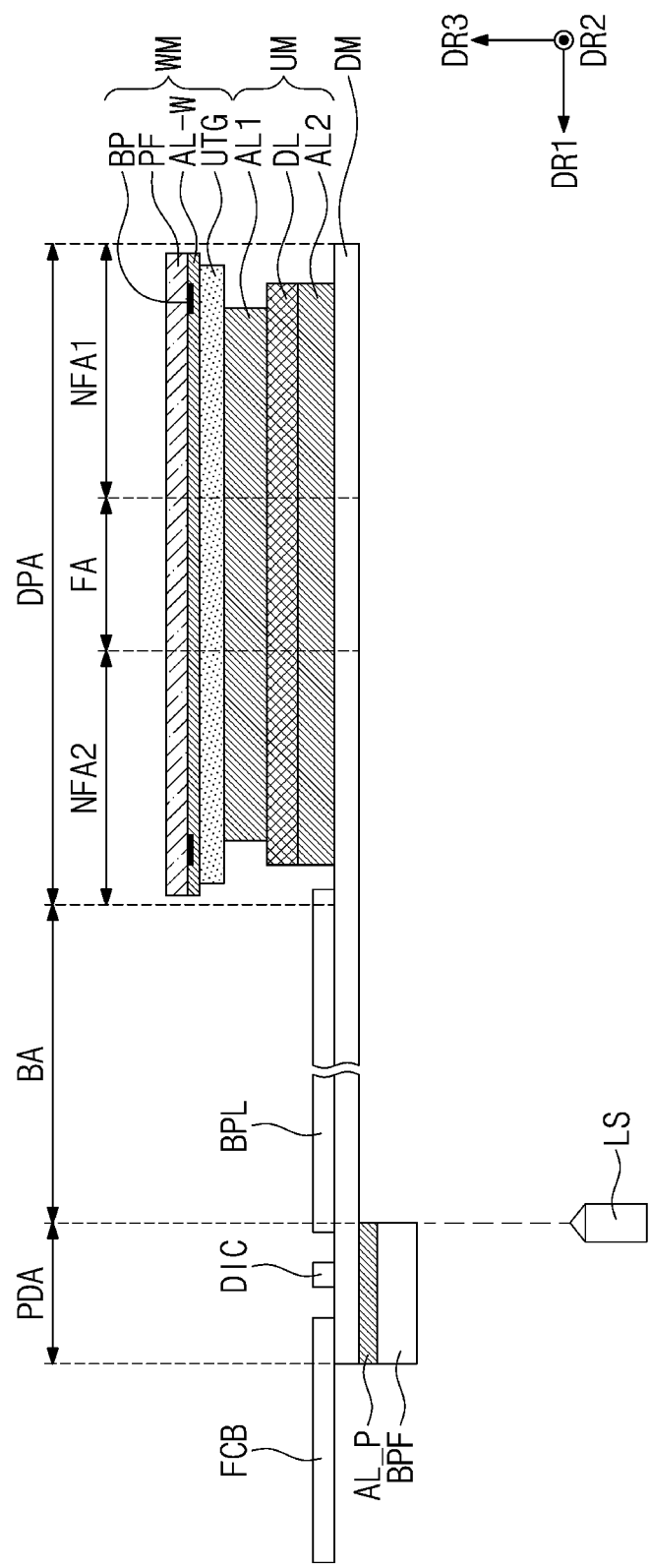

FIGS. 7A to 7E are schematic cross-sectional views of a method of manufacturing the display device according to an embodiment of the disclosure. FIGS. 7A to 7E show a coupling process of the lower protective film BPF (refer to FIG. 3) and the lower protective member BPP (refer to FIG. 3). FIGS. 7A to 7C show deposition and encapsulating processes (display FAB process), and FIGS. 7D and 7E show a coupling process of a lower member, the driving chip (DIC), and the flexible circuit board (FCB) (display MODULE process).

Referring to FIGS. 6 and 7A, the display module DM may be prepared (S100). The display module DM may include the display part DPA, the bending part BA adjacent to the display part DPA, the pad part PDA being adjacent to the bending part BA. For example, the display part DPA, the bending part BA, and the pad part PDA may be arranged in the first direction DR1.

The bending protective layer BPL may be coupled to the upper portion of the display module DM. The bending protective layer BPL may be coupled to the display module DM to correspond to the bending part BA and portions of the display part DPA and the pad part PDA. FIG. 7A shows the structure in which the bending protective layer BPL is coupled to the display module DM before the lower protective film BPF (refer to FIG. 3) and the lower protective member BPP (refer to FIG. 3) are coupled to the display module DM as a representative example, however, the disclosure should not be limited thereto or thereby. As an example, the bending protective layer BPL may be coupled to the display module DM during the process of coupling the lower protective film BPF and the lower protective member BPP to the display module DM, or may instead be coupled to the display module DM after the lower protective film BPF and the lower protective member BPP are coupled to the display module DM.

Referring to FIGS. 6 and 7B, a lower protective film BPF_I may be coupled to the lower portion of the display module DM (S200). For the convenience of explanation, the lower protective film BPF_I before the process of removing the portions of the lower protective film will be referred to as a preliminary lower protective film BPF_I, and a protective film adhesive layer AL-PI before the process of removing the portions of the protective film adhesive layer will be referred to as a preliminary protective film adhesive layer AL-PI. The preliminary lower protective film BPF_I may be coupled to the lower portion of the display module DM to entirely correspond to each of the display part DPA, the bending part BA, and the pad part PDA. The preliminary lower protective film BPF_I may include a flexible synthetic resin film. As an example, the preliminary lower protective film BPF_I may include a polyimide film.

The preliminary lower protective film BPF_I may be coupled to the display module DM by the preliminary protective film adhesive layer AL-PI. The preliminary protective film adhesive layer AL-PI may be disposed on (e.g., directly on) the lower portion of the display module DM, and the preliminary lower protective film BPF_I may be disposed on (e.g., directly on) a lower portion of the preliminary protective film adhesive layer AL-PI.

A conventional manufacturing method of a display device further includes a process of attaching a release film to a lower protective film. According to the disclosure, the release film that protects the display module DM and a lower structure in the manufacturing method of the display device DD may be omitted. Since the preliminary lower protective film BPF_I may be attached to entirely correspond to the display part DPA, the bending part BA, and the pad part PDA, the entire lower portion of the display module DM may be protected. According to the disclosure, as the release film may be omitted, a cost for the release film may be reduced, and the manufacturing time and cost of the display device DD may be reduced.

Referring to FIGS. 6 and 7C, the window WM may be coupled to the display module DM (S300). In detail, the upper member UM may be coupled to an upper portion of the display module DM, and the window WM may be coupled to an upper portion of the upper member UM.

The upper film DL may be coupled to the upper portion of the display module DM by the second adhesive layer AL2. The upper film DL may absorb the external impact applied to the front surface of the display device DD (refer to FIG. 3). The glass substrate UTG may be coupled to the upper film DL by the first adhesive layer AL1. The window protective layer PF may be coupled to an upper portion of the glass substrate UTG by the window adhesive layer AL-W. The bezel pattern BP may be formed on the lower surface of the window protective layer PF, however the disclosure should not be limited thereto or thereby. According to an embodiment, the upper film DL and the second adhesive layer AL2 may instead be omitted.

Details of the second adhesive layer AL2, the upper film DL, the first adhesive layer AL1, the glass substrate UTG, the window adhesive layer AL-W, the window protective layer PF, and the bezel pattern BP may be substantially the same as those described with reference to FIG. 3.

Referring to FIGS. 6 and 7D, portions of the preliminary lower protective film BPF_I (refer to FIG. 7C) corresponding to the display part DPA and the bending part BA may be removed (S400). In case that these portions of the preliminary lower protective film BPF_I is removed, an ultraviolet laser beam (not shown) may be irradiated, and a $CO_2$ laser beam LS may be irradiated. In detail, an adhesion of the preliminary protective film adhesive layer AL-PI (refer to FIG. 7C) may be alleviated (or nullified) by irradiating the ultraviolet laser beam and the $CO_2$ laser beam LS may be irradiated. The $CO_2$ laser beam LS may be irradiated once onto the lower surface of the preliminary lower protective film BPF_I. For example, one cutting line may be formed. The preliminary lower protective film BPF_I corresponding to the display part DPA and the bending part BA may be removed with respect to the cutting line formed in the preliminary lower protective film BPF_I. The lower protective film BPF may be formed by the above-described process. The process of removing the portion of the preliminary lower protective film BPF_I using the ultraviolet laser beam and the $CO_2$ laser beam LS may be carried out in the display MODULE process.

In the conventional manufacturing method of the display device, the portion of the preliminary lower protective film BPF_I corresponding to the bending part BA may be removed by irradiating the $CO_2$ laser beam LS twice to the preliminary lower protective film BPF_I. According to the disclosure, the portion of the preliminary lower protective film BPF_I corresponding to the display part DPA and the bending part BA may be removed by irradiating the $CO_2$ laser beam LS once to the preliminary lower protective film BPF_I. According to the disclosure, as the $CO_2$ laser beam LS may be irradiated only once, a tact time of the manufacturing process of the display device DD may be shortened. For example, the time required to produce the display device DD may be shortened.

The driving chip DIC may be mounted on the pad part PDA of the display module DM. Further, the flexible circuit board FCB may be coupled to the pad part PDA of the display module DM.

Referring to FIGS. 6 and 7E, the lower protective member BPP may be coupled to the lower portion of the display module DM (S500). The lower protective member BPP may correspond to the display part DPA. For example, the lower protective member BPP may be coupled to the display module DM and may be spaced apart from the lower protective film BPF in the first direction DR1.

The material for the lower protective member BPP may be different from the material for the lower protective film BPF. As an example, the lower protective film BPF may include the ceramic-based material, the resin material, the flexible polymer foam, or a combination thereof. The lower protective member BPP may be one of the lower protective members BPP, BPPa, BPPb, and BPPc shown in FIGS. 5A to 5D.

The lower protective member BPP may be coupled to the lower portion of the display module DM. In detail, the lower protective member BPP may be coupled to the display module DM by the adhesive layer AL. The adhesive layer AL may be disposed on (e.g., directly on) the lower portion of the display module DM, and the lower protective member BPP may be disposed on (e.g., directly on) the lower portion of the adhesive layer AL.

According to the disclosure, as the portion of the preliminary lower protective film BPF_I (refer to FIG. 7C) may be removed and the lower protective member BPP may be coupled, the thickness of lower components of the display module DM may be reduced. Accordingly, the display device DD may be more readily bent or folded.

Referring to FIGS. 7D and 7E, the portions of the lower protective film BPF corresponding to the display part DPA and the bending part BA may be removed, and the lower protective member BPP may subsequently be coupled to the display module DM to correspond to the display part DPA, and as a result, the display device DD may be formed. However, the disclosure should not be limited thereto or thereby. According to an embodiment, the display device DD may instead be formed by entirely removing the lower protective film BPF and then coupling the lower protective member BPP to the display module DM to correspond to the display part DPA. A separate protective member may subsequently be coupled to the lower portion of the display module DM to correspond to the pad part PDA to protect the display module DM.

Although the embodiments of the disclosure have been described, it may be understood that the disclosure should not be limited to these embodiments but various changes and modifications can be made by one ordinary skilled in the art within the spirit and scope of the disclosure as hereinafter claimed. Therefore, the disclosed subject matter should not be limited to any single embodiment described herein, and the scope of the inventive concept shall be determined according to the attached claims.

What is claimed is:

1. A method of manufacturing a display device, the method comprising:
    preparing a display module having a display part, a bending part adjacent to the display part, and a pad part adjacent to the bending part;
    coupling a lower protective film including a polyimide film to a lower portion of the display module;
    coupling a window to an upper portion of the display module;
    removing a portion of the lower protective film corresponding to each of the display part and the bending part after the coupling of the window to the upper portion of the display module; and
    coupling a lower protective member to the lower portion of the display module to correspond to the display part, the lower protective member including a material different from a material of the lower protective film.

2. The method of claim 1, wherein the removing of the portion of the lower protective film comprises irradiating a $CO_2$ laser beam onto a lower surface of the lower protective film.

3. The method of claim 1, wherein the lower protective member has a non-lattice structure.

4. The method of claim 1, wherein the lower protective member comprises a ceramic-based material.

5. The method of claim 1, wherein the lower protective member having a first non-folding area, a folding area, and a second non-folding area disposed in a first direction, the lower protective member comprises:
    a folding plate having at least a portion that corresponds to the folding area, the folding plate including a first material;
    a first plate corresponding to the first non-folding area and including a second material different from the first material; and
    a second plate corresponding to the second non-folding area and including the second material.

6. The method of claim 5, wherein the first material has a Young's modulus smaller than a Young's modulus of the second material.

7. The method of claim 5, wherein the folding plate is disposed between the first plate and the second plate and does not correspond to each of the first non-folding area and the second non-folding area.

8. The method of claim 5, wherein the folding plate comprises:
    a first portion disposed between the first plate and the second plate; and
    a second portion disposed between the display module and each of the first plate, the second plate, and the first portion.

9. The method of claim 5, wherein the folding plate comprises:
    a first portion disposed between the first plate and the second plate; and
    a second portion disposed on a lower surface of the first plate, a lower surface of the second plate, and a lower surface of the first portion.

10. The method of claim 5, wherein
    the first material is selected from a resin material, a flexible polymer foam, or a combination thereof, and
    the second material comprises a ceramic-based material.

11. The method of claim 1, wherein the lower protective member is spaced apart from the lower protective film in a first direction while being coupled to the lower portion of the display module.

* * * * *